Nov. 5, 1929. E. L. PETTERSON 1,734,875
HARROW OR THE LIKE WITH YIELDING PRONGS
Filed Jan. 18, 1928
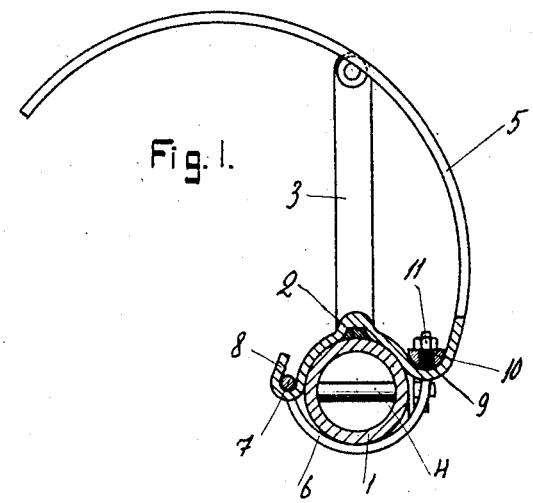
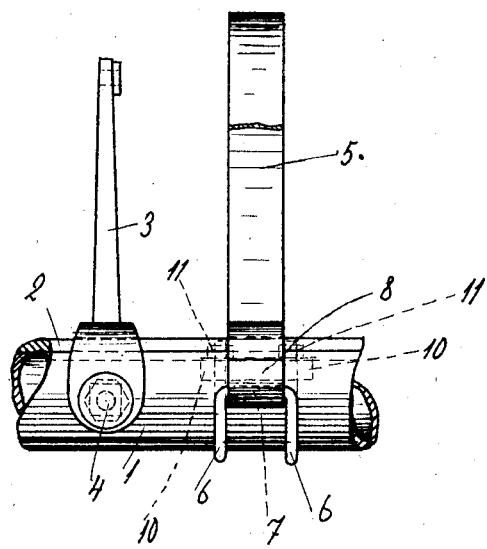

Patented Nov. 5, 1929

1,734,875

UNITED STATES PATENT OFFICE

ERNST LUDVIG PETTERSON, OF ARBOGA, SWEDEN

HARROW OR THE LIKE WITH YIELDING PRONGS

Application filed January 18, 1928, Serial No. 247,649, and in Sweden February 17, 1927.

This invention relates to improvements in harrows, the object of the invention being to provide an improved harrow having yielding prongs and round shafts on which said prongs are mounted together with a securing member of novel construction all arranged so that the prongs may be readily adjusted to the required distance apart.

An embodiment of the invention is shown in the accompanying drawing where Figures 1 and 2 show the device viewed from two sides at right angles to each other, Figure 1 being partly a section.

According to the embodiment shown in the drawing a longitudinal spline 2 is mounted on the tubular shaft 1 and held for instance by rivets and also by a known adjusting rod 3, whose lower end is shaped to fit the shaft and receive the spline and secured to the former by a bolt 4 provided with a nut. The yielding prong 5 which has at some distance from one end a half circular bend resting against the shaft and provided at one end with a hook 8, is locked in its position on the shaft, by a clamp in the shape of a bow 6 extending across one side of the tube 1 and whose crosspiece 7 is embraced by the hook 8 of the half circular bend of the prong, the shanks of the bow being shaped as screw-bolts 9, nuts 11 being mounted thereon and adapted to be tightened on a crosspiece 10 placed above the prong.

While I have herein shown and described a preferred form of my invention, I would have it understood that changes may be made in the form, construction and proportion of the several parts within the scope of my invention as defined in the appended claim.

No claim is made herein for an adjustable yielding prong for round shafts of harrows, said prong having near one end an arched contact surface for receiving the round shaft, and also having a transverse groove to be engaged by a longitudinal projecting part of the round shaft, as this is described and claimed in my copending application for Letters Patent of the United States filed January 18, 1928, Serial No. 247,650 for adjustable yielding prongs for round shafts of harrows and the like.

Having now described my invention, what I claim as new and desire to secure by Letters Patent is:

In a harrow having yielding prongs and round shafts on which said prongs are mounted, a prong having at some distance from one end a half-circular bend to receive the round shaft and said end of the prong being provided with a hook, in combination with a securing member, comprising a cross-piece engaged by said hook and connecting two screw-bolts with each other and a second cross-piece on said bend, opposite the first named cross-piece, said screw-bolts being curved from the cross-piece to their free ends, extending parallel to each other round a part of the shaft to engage the prong at a point opposite to the hook and extending through openings in the second named cross-piece, the free ends of the screw-bolts being situated on each side of the prong and having nuts bearing on the second named cross-piece for locking the screw-bolts to the prong.

In witness whereof, I have hereunto signed my name.

ERNST LUDVIG PETTERSON.